(12) United States Patent
Snow et al.

(10) Patent No.: US 7,878,744 B2
(45) Date of Patent: Feb. 1, 2011

(54) FIBROUS MICROENCAPSULATED WASHER FOR FASTENERS

(75) Inventors: Gerald F. Snow, Almont, MI (US); Raymond G. Batura, Metamora, MI (US)

(73) Assignee: ND Industries, Inc., Clawson, MI (US)

( * ) Notice: Subject to any disclaimer, the term of this patent is extended or adjusted under 35 U.S.C. 154(b) by 47 days.

(21) Appl. No.: 11/801,140

(22) Filed: May 9, 2007

(65) Prior Publication Data

US 2007/0292241 A1 Dec. 20, 2007

Related U.S. Application Data

(60) Provisional application No. 60/811,458, filed on Jun. 6, 2006.

(51) Int. Cl.
*F16B 1/00* (2006.01)

(52) U.S. Cl. .................................... 411/82.3; 411/542

(58) Field of Classification Search ......... 411/531–546, 411/82, 82.3, 258, 930, 147; 277/534–536, 277/936–938; 264/4, 4.3, 4.32, 4.33, 4.34, 264/4.4, 4.6, 4.7; 156/283, 307.3
See application file for complete search history.

(56) References Cited

U.S. PATENT DOCUMENTS

| | | | |
|---|---|---|---|
| 1,640,543 A * | 8/1927 | Gudge | 16/2.1 |
| 2,775,917 A * | 1/1957 | Ferguson | 411/527 |
| 3,639,137 A * | 2/1972 | Marinelli | 428/321.5 |
| 3,746,068 A | 7/1973 | Deckert et al. | |
| 3,767,211 A * | 10/1973 | Amphlett | 277/316 |
| 3,950,579 A | 4/1976 | Wallace | |
| 4,059,136 A | 11/1977 | Wallace | |
| 4,081,012 A | 3/1978 | Wallace | |
| 4,262,038 A | 4/1981 | Wallace | |
| 4,268,544 A | 5/1981 | Wallace | |
| 4,279,943 A | 7/1981 | Wallace | |
| 4,285,378 A | 8/1981 | Wallace | |
| 4,321,885 A | 3/1982 | Wallace | |
| 4,325,985 A | 4/1982 | Wallace | |
| 4,399,166 A | 8/1983 | Wallace | |
| 4,428,982 A | 1/1984 | Wallace | |
| 4,501,041 A | 2/1985 | Wallace | |
| 4,508,759 A | 4/1985 | Wallace | |
| 4,536,524 A * | 8/1985 | Hart et al. | 523/176 |
| 4,545,712 A | 10/1985 | Wallace | |
| 4,758,003 A * | 7/1988 | Goldstein et al. | 277/314 |
| 4,847,113 A | 7/1989 | Wallace | |
| 4,851,175 A | 7/1989 | Wallace | |
| 4,865,792 A * | 9/1989 | Moyer | 264/249 |
| 4,871,181 A * | 10/1989 | Usher et al. | 277/627 |
| 4,891,244 A | 1/1990 | Wallace | |
| 5,000,636 A | 3/1991 | Wallace | |
| RE34,522 E | 1/1994 | Wallace | |
| 5,306,346 A | 4/1994 | DiMaio et al. | |
| 5,362,073 A * | 11/1994 | Upton et al. | 277/589 |
| 5,403,624 A | 4/1995 | DiMaio et al. | |
| 5,426,130 A | 6/1995 | Thurber et al. | |
| 5,518,768 A | 5/1996 | Wallace et al. | |
| 5,607,720 A | 3/1997 | Wallace et al. | |
| 5,651,824 A | 7/1997 | Wallace et al. | |
| 5,656,325 A | 8/1997 | Wallace | |
| 5,672,376 A | 9/1997 | Wallace | |
| 5,679,160 A | 10/1997 | Wallace et al. | |
| 5,803,464 A * | 9/1998 | Ueda et al. | 277/528 |
| 5,817,177 A | 10/1998 | Wallace | |
| 5,836,721 A | 11/1998 | Wallace | |
| 5,918,727 A | 7/1999 | Wallace et al. | |
| 5,928,711 A | 7/1999 | Wallace et al. | |
| 5,964,551 A | 10/1999 | Wallace | |
| 6,027,568 A | 2/2000 | Wallace et al. | |
| 6,063,437 A | 5/2000 | Wallace et al. | |
| 6,228,169 B1 | 5/2001 | Wallace | |
| 6,270,838 B1 | 8/2001 | Wallace et al. | |
| 6,322,628 B1 | 11/2001 | Wallace | |
| 6,474,919 B2 | 11/2002 | Wallace et al. | |
| 6,592,990 B2 * | 7/2003 | Schwantes | 428/402.21 |
| 6,620,246 B2 | 9/2003 | Alaimo et al. | |
| 6,736,406 B1 * | 5/2004 | Provencher | 277/628 |
| 6,824,342 B2 * | 11/2004 | Gassmann et al. | 411/441 |
| 7,229,516 B2 * | 6/2007 | Busby et al. | 156/247 |
| 2006/0253975 A1 * | 11/2006 | Rogers et al. | 4/688 |

* cited by examiner

*Primary Examiner*—Gary Estremsky
(74) *Attorney, Agent, or Firm*—Winston & Strawn LLP

(57) ABSTRACT

A fibrous microencapsulated washer is provided for sealing and retaining a fastener. The fibrous microencapsulated washer includes a substrate and a coating of a microencapsulated material on the substrate. The fibrous microencapsulated washer includes an aperture extending therethrough to receive a fastener, whereby a radial installation of the fastener causes the microencapsulated material to react on the substrate to form a seal and to adhesively secure the fastener to a workpiece.

23 Claims, 2 Drawing Sheets

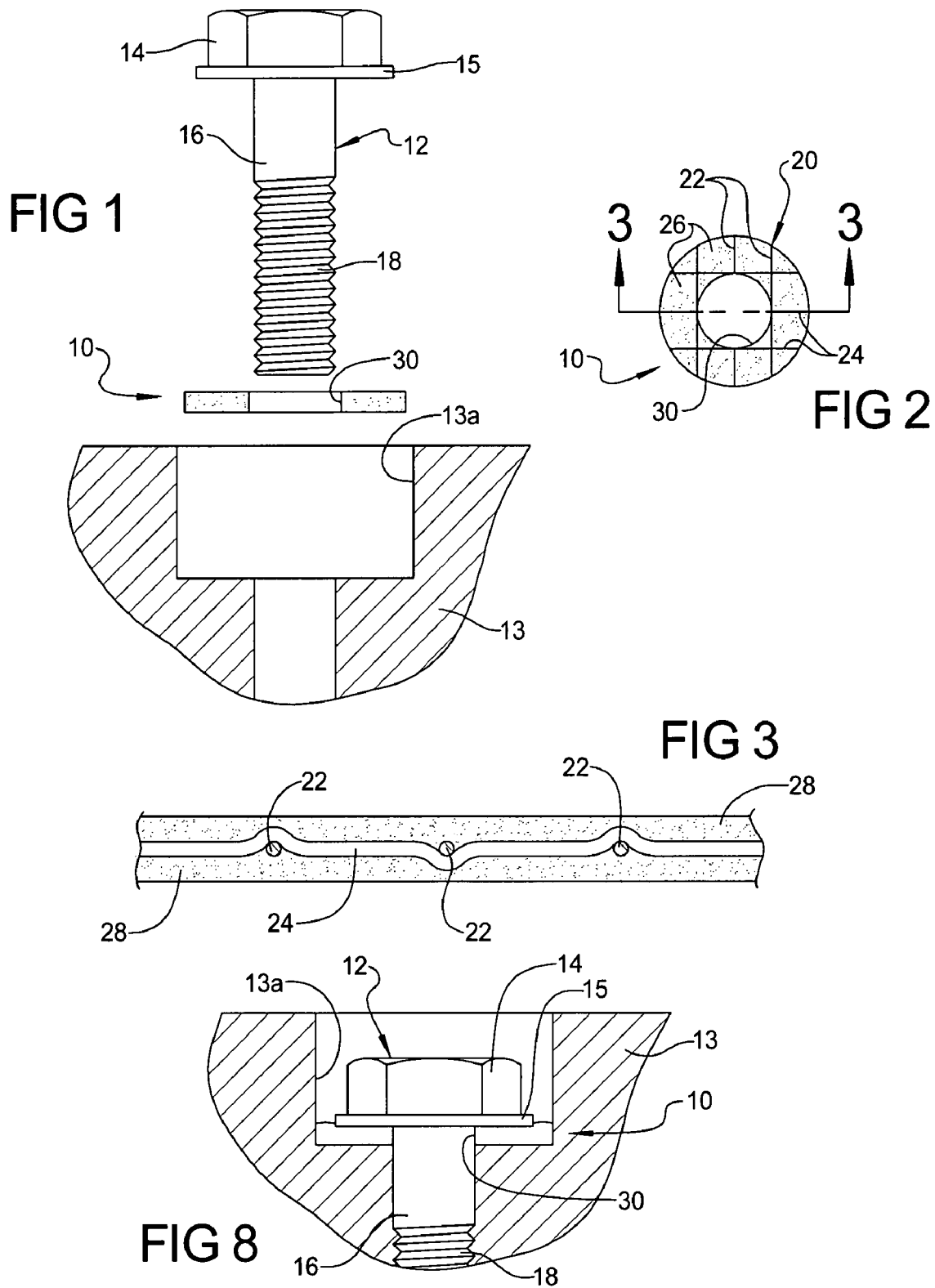

FIBROUS MICROENCAPSULATED WASHER FOR FASTENERS

CROSS-REFERENCE TO RELATED APPLICATION(S)

The present invention claims the priority date of U.S. Provisional Patent Application Ser. No. 60/811,458, filed Jun. 6, 2006.

BACKGROUND OF THE INVENTION

1. Field of Invention

The present invention relates generally to fasteners and, more particularly, to a fibrous microencapsulated washer for sealing and retaining fasteners.

2. Description of the Related Art

Fasteners are frequently used to join materials such as sheets or panels. Such constructions are commonly used in a wide variety of industries. In one such example, in the automotive industry, a panel is provided with an aperture or bore therein having a diameter slightly greater than that of a bolt or similar fastener. The bolt is passed through the bore and may be assembled to a mating fastener such as a nut or the like in order to join the panel to another structural element.

In many such assemblies, fluid may be present that may leak through the bore and past the fastener when tightened. As a result, it is desirable to seal the fastener around the bore. Also, in many such assemblies, after the fastener has been tightened or secured, the fastener may become loosened due to certain conditions and may exit the bore. As a result, it is desirable to retain the fastener in place after tightening, whereby it cannot accidentally become loosened or be dislodged as a result of forces acting thereon. Therefore, there is a need in the art to provide a device for sealing and retaining a fastener.

SUMMARY OF THE INVENTION

It is, therefore, one object of the present invention to provide a fibrous microencapsulated washer for sealing and retaining a fastener on a workpiece.

To achieve at least one of the foregoing objects, the present invention is a fibrous microencapsulated washer for sealing and retaining a fastener. The fibrous microencapsulated washer includes a substrate and a coating of a microencapsulated material on the substrate. The fibrous microencapsulated washer includes an aperture extending therethrough to receive a fastener, whereby a radial installation of the fastener causes the microencapsulated material to react on the substrate to form a seal and to adhesively secure the fastener to a workpiece.

One advantage of the present invention is that a fibrous microencapsulated washer is provided for sealing and retaining a fastener. Another advantage of the present invention is that the fibrous microencapsulated washer will not react to form a seal and retention device for the fastener until a radial installation is placed on the washer by the fastener or a mating substrate. Yet another advantage of the present invention is that the fibrous microencapsulated washer reduces vibration between the fastener and the workpiece.

Other objects, features, and advantages of the present invention will be readily appreciated, as the same becomes better understood, after reading the subsequent description when considered in connection with the accompanying drawings.

BRIEF DESCRIPTION OF THE DRAWINGS

FIG. 1 is an exploded fragmentary elevational view of a fibrous microencapsulated washer, according to the present invention, illustrated in operational relationship with a fastener and workpiece.

FIG. 2 is a plan view of the fibrous microencapsulated washer of FIG. 1.

FIG. 3 is a sectional view taken along the line 3-3 of FIG. 2.

FIG. 8 is a fragmentary elevational view of the fibrous microencapsulated washer of FIG. 1 illustrated in an assembled state with the fastener and workpiece of FIG. 1.

DESCRIPTION OF THE PREFERRED EMBODIMENT(S)

Figure 4:
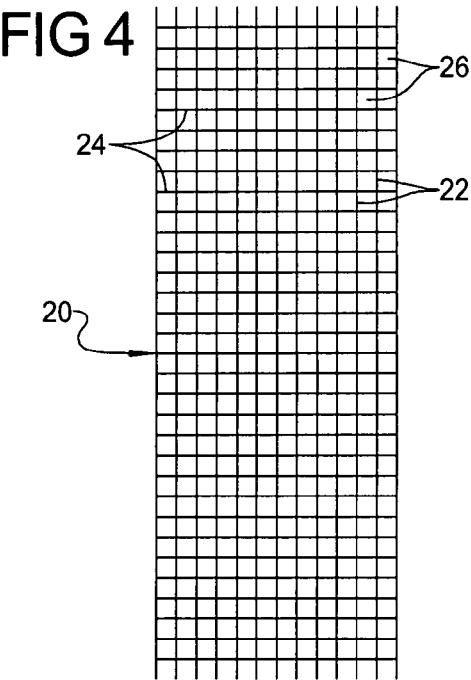
FIG. 4 is an elevational view of a first step in a method, according to the present invention, of making the fibrous microencapsulated washer of FIG. 1.

Referring now to the drawings and in particular FIG. 1, one embodiment of a fibrous microencapsulated washer 10, according to the present invention, is shown for a fastener, generally indicated at 12. Although the fastener 12 of the present invention is illustrated as a bolt, it should be appreciated that it can be utilized with a wide range of other fasteners, including screws and the like to seal and retain such fasteners in position, for example within an aperture or bore 13a, on a workpiece 13.

As illustrated, the fastener 12 has a head 14 extending radially. The head 14 may have a generally circular flange 15 extending radially outwardly from a bottom of the head 14. The fastener 12 also has a shaft or shank 16 extending axially from the head 14. The shank 16 is generally cylindrical in shape and has a generally circular cross-sectional shape. The shank 16 may have a threaded portion 18 to engage the workpiece 13. The fastener 12 is made of a rigid material such as metal or plastic. It should be appreciated that the fastener 12 is conventional and known in the art.

Referring to FIGS. 2 and 3, the fibrous microencapsulated washer 10 includes a substrate, generally indicated at 20, for example a mesh. The substrate 20 has a plurality of radially extending first fibers 22 spaced from each other and a plurality of radially extending second fibers 24 spaced from each other and orientated relative to the first fibers 22 to form spaces 26 therebetween. The first fibers 22 may be secured to or integral with the second fibers 24. The substrate 20 may be made of a suitable material such as plastic, fiberglass, cloth, cork, or any other media deemed suitable for manufacturing.

The fibrous microencapsulated washer 10 also includes a coating 28 disposed over the substrate 20. The coating 28 is a microencapsulated material. In one embodiment, the coating 28 impregnates the substrate 20. In another embodiment, the coating 28 is a topical coating on the substrate 20. The microencapsulated material may be an adhesive, expandable sealant, or a conventional PTFE sealant. In the embodiment of an adhesive, the microencapsulated material is a resin and curing agent. In such formulations, the encapsulated resin and curing agent do not react until the capsules are broken and the resin and curing agent are able to contact one another. One example of such a microencapsulated adhesive material is a composition of 70-80 wt. % of aromatic dimethacrylate ester, 20-25 wt. % polyethylene wax, 1-3 wt. % dibenzoyl peroxide, and less than 5 wt. % of a polyvinyl alcohol. Another example of such a microencapsulated adhesive material is a composition of 20-25 wt. % of cycloaliphatic amine, 5-7 wt. % synthetic polymer resin, 5-10 wt. % silica, 50-55 wt. % epoxy resin, and 15-20 wt. % of a urea-formaldehyde-melamine polymer. An example of such a microencapsulated adhesive expandable sealant material is a composition of 20-25 wt. % of cycloaliphatic amine, 5-7 wt. % synthetic polymer resin, 50-55 wt. % epoxy resin, 10-15 wt. % of urea-formaldehyde-melamine polymer, and 1-5 wt. % of an encapsulated blowing agent. It should be appreciated that the binder could be made of a more flexible material such as polyamine, polymethacrylate, or polyurethane. It should also be appreciated that the coating 28 is disposed over both sides of the substrate 20 and fills the spaces 26 therebetween.

The fibrous microencapsulated washer 10 also includes an aperture 30 extending through the substrate 20 and coating 28. The aperture 30 is centrally located and generally circular in shape. The fibrous microencapsulated washer 10 may have any suitable shape such as tapered, conical, inserted for molded shapes, cylindrical sleeve, or the like. It should be appreciated that the shank 16 of the fastener 12 extends through the aperture 30 in the washer 10.

Figure 5:
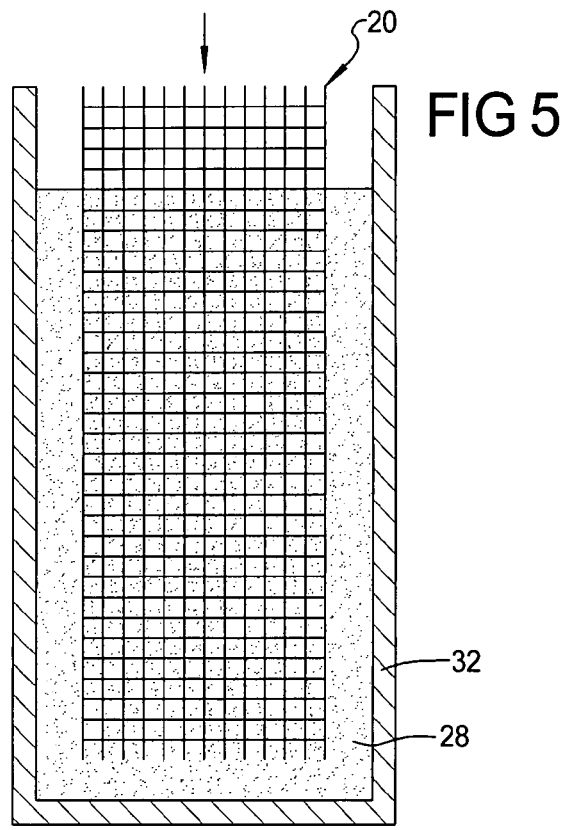
FIG. 5 is a fragmentary elevational view of a second step in the method of making the fibrous microencapsulated washer of FIG. 1.
Figure 6:
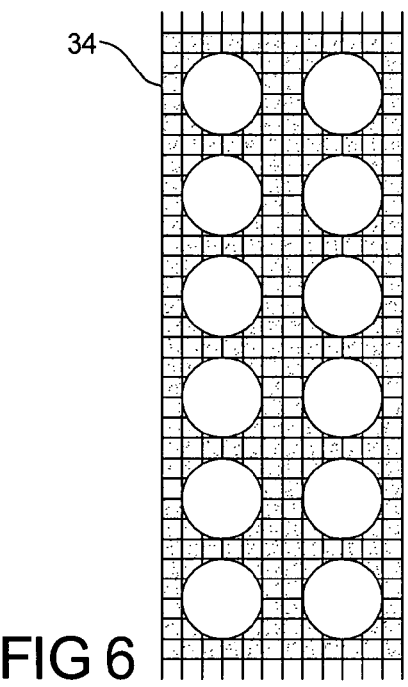
FIG. 6 is a plan view of a third step in the method of making the fibrous microencapsulated washer of FIG. 1.
Figure 7:
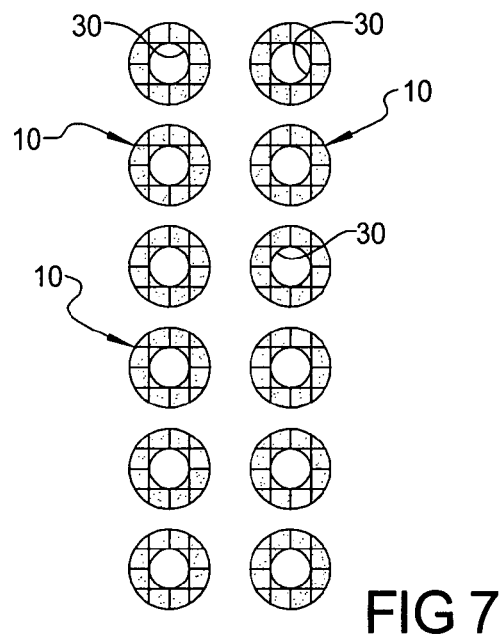
FIG. 7 is a plan view of a fourth step in the method of making the fibrous microencapsulated washer of FIG. 1.

To make the fibrous microencapsulated washer 10, one method, according to the present invention, is illustrated in FIGS. 4 through 7. As illustrated in FIGS. 4 and 5, the method includes the step of providing the substrate 20 and the coating 28. As illustrated in FIG. 4, the substrate 20 is provided as a generally rectangular mesh strip having the first fibers 22 and the second fibers 24 forming the spaces 26. The coating 28 is provided as a liquid in a vessel 32. As illustrated in FIG. 5, the method includes the step of submersing the substrate 20 in the coating 28 for a time period. The method also includes the step of removing a coated substrate 34 from the vessel 32 and allowing the coated substrate 34 to dry until the coating 28 is dry on the substrate 20. The method includes the step of forming the washers 10, for example by cutting, from the coated substrate 32 having the aperture 30 extending through the fibrous microencapsulated washers 10. It should be appreciated that the washers 10 may have any suitable shape.

To assemble, the fibrous microencapsulated washer 10 is placed over the shank 16 of the fastener 12 such that the shank 16 extends through the aperture 30 in the fibrous microencapsulated washer 10 as illustrated in FIG. 8. The fibrous washer 10 is moved along the shank 16 and disposed adjacent to the flange 15 of the head 14 of the fastener 12.

In operation, the fastener 12 is tightened toward the workpiece 13. As the fastener 12 is rotated, the radial and axial load on the head 14 is transferred by the head 14 to the flange 15 to place a radial installation force against fibrous washer 10, causing the capsules of the coating 28 to rupture. In the embodiment of an adhesive, the resin and curing agent contact one another. The contacting of the resin and curing agent forms an adhesive, for example an epoxy, on the substrate 20 to seal and retain the head 14 of the fastener 12 to the workpiece 13. It should be appreciated that a predetermined torque, for example fifteen torque-pounds, are required to loosen the fastener 12 from the workpiece 13. It should be appreciated that the predetermined torque is based on the size of the fastener 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fibrous microencapsulated washer for sealing and retaining a fastener comprising:
   a mesh substrate comprising a plurality of first fibers spaced from each other and extending in a first direction and a plurality of second fibers spaced from each other and extending in a second direction to form spaces therebetween that extend through the mesh substrate; and
   a dry coating of a microencapsulated adhesive disposed on said mesh substrate such that the microencapsulated adhesive fills the spaces in the mesh substrate;
   wherein the coated mesh substrate defines a centrally located aperture for receiving a fastener having a solid shank;
   wherein the microencapsulated adhesive is adapted to burst and react as a solid shank of the fastener extends through the centrally located aperture and the fastener is tightened against the washer so that the adhesive secures the fastener.

2. A fibrous microencapsulated washer as set forth in claim 1 wherein said second fibers extend in a second direction substantially transverse to the first direction of said first fibers.

3. A fibrous microencapsulated washer as set forth in claim 2 wherein said coating is disposed over both sides of said substrate and fills the spaces therebetween.

4. A fibrous microencapsulated washer as set forth in claim 2 wherein said first fibers are secured to or integral with said second fibers.

5. A fibrous microencapsulated washer as set forth in claim 1 wherein said substrate is made of a material comprising plastic, fiberglass, cloth, or cork.

6. A fibrous microencapsulated washer as set forth in claim 1 wherein coating is a topical coating on said substrate.

7. A fibrous microencapsulated washer as set forth in claim 1 wherein said coating is impregnated in said substrate.

8. A fibrous microencapsulated washer as set forth in claim 1 wherein said microencapsulated adhesive comprises a resin and curing agent.

9. A fibrous microencapsulated washer as set forth in claim 1 wherein said coating is a composition of 70-80 wt. % of aromatic dimethacrylate ester, 20-25 wt. % polyethylene wax, 1-3 wt. % dibenzoyl peroxide, and less than 5 wt. % of a polyvinyl alcohol.

10. A fibrous microencapsulated washer as set forth in claim 1 wherein said coating is a composition of 20-25 wt. % of cycloaliphatic amine, 5-7 wt. % synthetic polymer resin, 5-10 wt. % silica, 50-55 wt. % epoxy resin, and 15-20 wt. % of a urea-formaldehyde-melamine polymer.

11. A fibrous microencapsulated washer as set forth in claim 1 wherein said coating is a composition of 20-25 wt. % of cycloaliphatic amine, 5-7 wt. % synthetic polymer resin, 50-55 wt. % epoxy resin, 10-15 wt. % of urea-formaldehyde-melamine polymer, and 1-5 wt. % of an encapsulated blowing agent.

12. A fibrous microencapsulated washer as set forth in claim 1 wherein said aperture is centrally located and generally circular in shape.

13. A fibrous microencapsulated washer as set forth in claim 1 wherein said fibrous microencapsulated washer has a cylindrical shape.

14. A method of making a fibrous microencapsulated washer for sealing and retaining a fastener, said method comprising the steps of:

providing a mesh substrate comprising a plurality of first fibers spaced from each other and extending in a first direction and a plurality of second fibers spaced from each other and extending in a second direction to form spaces therebetween that extend through the mesh substrate;

coating the mesh substrate with a microencapsulated adhesive such that the microencapsulated adhesive fills the spaces in the mesh substrate; and forming at least one washer having a centrally located aperture from the coated mesh substrate;

wherein the microencapsulated adhesive is adapted to burst and react as a solid shank of a fastener extends through the centrally located aperture and the fastener is tightened against the washer so that the adhesive secures the fastener.

15. A method as set forth in claim 14 wherein said step of providing a substrate comprises providing the substrate as a generally rectangular mesh strip.

16. A method as set forth in claim 14 including the step of providing the coating as a liquid in a vessel.

17. A method as set forth in claim 16 including the step of submersing the substrate in the coating for a time period.

18. A method as set forth in claim 17 including the step of removing the coated substrate from the vessel and allowing the coated substrate to dry until the coating is dry on the substrate.

19. A method as set forth in claim 14 wherein said step of forming comprises forming the at least one washer by cutting the substrate.

20. A fastener assembly comprising:

a fastener having a solid shank;

a washer defining a centrally located opening for receiving the solid shank of the fastener;

the washer being made of a mesh substrate comprising a plurality of first fibers spaced from each other and extending in a first direction and a plurality of second fibers spaced from each other and extending in a second direction to form spaces therebetween that extend through the mesh substrate;

wherein the mesh substrate is coated with a microencapsulated adhesive such that the microencapsulated adhesive fills the spaces in the mesh substrate; and wherein the microencapsulated adhesive is adapted to burst and react as the solid shank of the fastener extends through the centrally located aperture and the fastener is tightened against the washer so that the adhesive secures the fastener.

21. A fastener assembly as set forth in claim 20 wherein said coating is a topical coating on said substrate.

22. A fastener assembly as set forth in claim 20 wherein said coating is impregnated in said substrate.

23. A fastener assembly as set forth in claim 20 wherein said microencapsulated adhesive comprises a resin and curing agent.

* * * * *